United States Patent Office 3,520,834
Patented July 21, 1970

3,520,834
FOAMABLE MOLDING COMPOSITION
Kunio Mizutani, Yokkaichi-shi, Takaaki Ito, Tokyo, and Kenyu Ono, Yokkaichi-shi, Japan, assignors to Mitsubishi Petrochemical Co., Ltd., Tokyo, Japan
No Drawing. Filed Aug. 18, 1967, Ser. No. 661,516
Int. Cl. C08f 47/10, 29/12; C08j 1/26
U.S. Cl. 260—2.5  1 Claim

ABSTRACT OF THE DISCLOSURE

Improving the moldability of a foamable polystyrene resin by incorporating therein a low-density polyethylene resin. The present invention relates to an expandable or foamable composition having an improved moldability and more particularly to a foamable and molding composition in which the extrusion moldability or blowing moldability of a foamable polystyrene resin can be improved by compounding a low-density polyethylene resin into the foamable polystyrene resin.

BACKGROUND OF THE INVENTION

Foamable polystyrenes endowed with a foamable property by incorporating therein a proper foamable agent during or after polymerization thereof or the pre-foamed polystyrenes have been widely utilized to form various foam articles. However, there are many difficulties in the case of producing moldings by subjecting the polystyrenes to extrusion molding or blowing molding. In particular, since there are problems concerning blowing molding, foamable polystyrenes are unsuitable for molding by such a molding process:

(1) Since the foamable efficiency is high, the polystyrene foams rapidly at the outlet of die in the case of conducting extrusion molding. Therefore, the diameter of parison is extremely enlarged and the inside thickness thereof is increased, which make it very difficult to provide parison of a desired shape.

This difficulty may be overcome by using a raw material in which the foamable property is lowered by reducing the content of the blowing agent but such a means of preparing a specific foamable polystyrene is not always profitable means in industry.

(2) The properties of parison tend to be easily influenced by the molding conditions, in particular, the molding temperature, i.e., the range of molding conditions applicable to extrusion molding is narrow.

(3) Since the cooling speed of parison is high, it is impossible to increase the blowing rate.

(4) The weld of a portion bited off by a metallic mold is insufficient and hence impact resistance of the portion is low.

(5) Small or thin-walled moldings cannot be formed.

(6) It is difficult to obtain moldings having complicated shapes or to mold fine structures.

Therefore, an object of this invention is to provide a foamable molding composition capable of being molded without accompanied with the aforesaid difficulties.

Another object of this invention is to provide a foamable polystyrene resin having an improved moldability.

BRIEF DESCRIPTION OF THE INVENTION

These objects of the present invention can be attained by blending a specific amount of a low-density polyethylene resin to a foamable polystyrene resin.

By using the molding composition of this invention, the above mentioned difficulties are overcome as well as the impact resistance of moldings prepared from the composition can be improved by the properties specific to the blend of a foamable polystyrene resin and a low-density polyethylene resin.

DETAILED DESCRIPTION OF THE INVENTION

It is preferably in general that the density of the low-density polystyrene resin to be compounded to a foamable polystyrene resin to improve the moldability of the polystyrene resin be in a range of from 0.91 to 0.93 g./cm.$^3$. Such a polyethylene resin is one produced usually by the so-called high-pressure method. The low-density polyethylene resin used in the present invention may be a copolymer of ethylene containing a small proportion of a co-monomer component or may be a mixture thereof. In most cases, the commercially available resins are applicable.

The foamable polystyrene resin whose moldability has been improved by incorporating therein the aforesaid low-density polyethylene resin and also which is the main component of the molding composition of the instant invention is a polystyrene resin endowed with the foamable property by the various methods as mentioned above. The polystyrene resin may be unfoamed or a pre-foamed one. Also, the molecular weight of the foamable polystyrene of this invention may be substantially the same as conventionally employed foamable polystyrenes. In most cases, commercially available polystyrenes may be used.

The foamable molding composition of this invention comprises the aforesaid foamable polystyrene resin and the aforesaid low-density polyethylene resin, the content of said low-density polyethylene resin in said composition being not more than 30% by weight, preferably 5–20% by weight. If more than 30% by weight of the low-density polyethylene resin is incorporated, the cell structures of the extruded material are destroyed, the surface states of moldings are reduced, and the impact resistance thereof is also reduced.

It is preferable to pre-mix the foamable polystyrene resin and the low-density polyethylene resin in a V-type blender or mixer (super mixer) and also it is preferable that the particle size of the former be substantially same as that of the latter. Moreover, in order to further improve the homogeneity of moldings, it is desirable that the above two components are in fine states and in a uniform mixture before supplying to an extruding machine. Also, if necessary, various additives or assistant components may be added.

The foamable molding composition of the present invention can be molded by various molding methods conventionally employed for molding such molding compositions but it is most profitable to mold the molding composition of this invention by extrusion molding or blowing molding. In this case, the molding conditions may be substantially the same as those employed for molding conventional foamable polystyrene but they may vary to some extent according to the amount and the molecular weight of the low-density polyethylene resin.

Now, the invention will be described by the following example.

Example 1

A mixture having the following composition was used.

| | Parts by weight |
|---|---|
| Foamable polystyrene beads (made by Yuka-Badishe Co.) (pre-foamed to some extent) | 100 |
| Powdered low-density polyethylene (made by Mitsubishi Petrochemical Co. Ltd. sp. gr. 0.918, grain size 40 meshes) | 5, 10, 20, 50 |

By using the molding composition, a one-liter bottle was formed by blowing molding and various tests were conducted about the bottle. The results are shown in the following table.

| Amount of polyethylene | Results | | | | | |
|---|---|---|---|---|---|---|
| | 0 | 5 | 10 | 20 | 30 | 50 |
| Examination item: | | | | | | |
| Molding temperature, °C | 110–130 | 130–160 | 130–160 | 130–160 | 130–160 | 130–160 |
| Uniformity of parison | (1) | (2) | (2) | (3) | (4) | (1) |
| Blowing property | (1) | (2) | (2) | (3) | (4) | (1) |
| Foamable efficiency | 8.5 | 6.0 | 3.5 | 2.3 | 2.2 | 1.8 |
| Strength of bite off [5] portion, cm | 68 | 108 | 79 | 84 | 70 | 64 |
| Strength,[6] kg | 4.0 | 4.4 | 5.6 | 8.0 | 10.4 | |
| Impact strength,[7] kg. cm./cm.$^2$ | 2.6 | 3.8 | 3.2 | 3.8 | 3.2 | 1.4 |

[1] Bad.
[2] Very good.
[3] Good.
[4] Little bad.
[5] The height when ten bottles filled with 1 liter of water let fall from the height in the fall impact test, 50% of them are destroyed.
[6] Compressed load when a definite distortion is provided to the bottle by compressing the laid down bottle.
[7] Dynstat impact strength (BS-1330).

What is claimed is:

1. A foamable molding composition having improved moldability comprising a foamable polystyrene resin and a low-density polyethylene incorporated therein in an amount of from 5 to 20% by weight, wherein the density of said low-density polyethylene is from 0.91 to 0.93 g./cm.$^3$.

References Cited

UNITED STATES PATENTS 3,224,984 12/1965 Roper et al.
3,320,188 5/1967 Dijkema _____ 260—2.5

MURRAY TILLMAN, Primary Examiner

M. FOELAK, Assistant Examiner

U.S. Cl. X.R.

260—897